United States Patent [19]

O'Brien, III

[11] Patent Number: 4,922,372

[45] Date of Patent: May 1, 1990

[54] SOLID STATE OVERCURRENT PROTECTION SYSTEM FOR CIRCUIT BREAKERS

[75] Inventor: Edward R. O'Brien, III, Wayne, Pa.

[73] Assignee: SPD Technologies Inc., Philadelphia, Pa.

[21] Appl. No.: 336,471

[22] Filed: Apr. 12, 1989

[51] Int. Cl.$^5$ .............................................. H02H 3/08
[52] U.S. Cl. ........................................ 361/97; 361/98; 307/288
[58] Field of Search ............... 361/57, 93, 94, 95, 361/96, 97, 98; 307/239, 288, 255

[56] References Cited

U.S. PATENT DOCUMENTS

| | | | |
|---|---|---|---|
| 3,803,455 | 4/1974 | Willard | 361/96 X |
| 3,988,643 | 10/1976 | Morris | 361/93 |
| 4,315,295 | 2/1982 | Zocholl | 361/96 |
| 4,368,500 | 1/1983 | Conroy, Jr. et al. | 361/94 |

Primary Examiner—Derek S. Jennings

[57] ABSTRACT

Apparatus for detecting a primary fault current in a three-phase current system and converting the detected fault current in the mechanical action for breaking a circuit in which the primary fault current occurred includes a combination of transformers and diodes for receiving the three phases of current, providing corresponding phases of secondary current within a predetermined desired amperage metering range, choosing the largest magnitude secondary current and providing the largest magnitude secondary current as output, a resistor for providing voltage proportional to the largest magnitude secondary current, a capacitor for storing a peak value of the voltage which is proportional to the largest magnitude secondary current and a latching circuit for moving a trip member and providing mechanical action in response to the largest magnitude secondary current exceeding a predetermined level.

19 Claims, 2 Drawing Sheets

SOLID STATE OVERCURRENT PROTECTION SYSTEM FOR CIRCUIT BREAKERS

FIELD OF THE INVENTION

This invention relates to circuit breakers in general and particularly to overcurrent protection circuitry integrally mounted within the circuit breakers.

DESCRIPTION OF THE PRIOR ART

Known thermo-mechanical or thermo-magnetic overcurrent protection systems for circuit breakers operate by deflection of bimetallic strips. Typically, the bimetallic strip deflects in response to rising temperature caused by fault currents flowing through the strip.

Known thermo-mechanical or thermo-magnetic overcurrent protection devices for circuit breakers are expensive to manufacture and require laborious calibration. These thermo-mechanical devices for circuit breakers are inherently temperature sensitive; their trip-time delay tends to decrease for a given fault current as ambient temperature rises.

Another problem with conventional thermo-mechanical overcurrent protection devices for circuit breakers is phase-to-phase interactions. Trip time for a three-phase fault current typically decreases from trip-time for a single phase fault current.

In conventional electronic overcurrent protection for circuit breakers, each of three phases of current is converted to a voltage by a burden resistor. The three voltages are then provided to a common point via diodes. The highest resulting voltage appears at the common point beyond the diodes. This back biases those diodes which are not connected to the highest current phase.

SUMMARY OF THE INVENTION

As used herein, the terms "fast-time trip" and "instantaneous trip", when associated with a current or a voltage, denote a current above which the circuit breaker of the invention has no reason to wait to trip (and thereby open a circuit of interest). The invention provides circuitry having instantaneous trip settable at five different levels, which may be selected by opening or closing switches associated with the invention.

In one of its aspects, this invention provides a device for detecting a primary fault current in a three-phase current system and converting the detected fault current into mechanical action for breaking the circuit carrying the primary fault current. The device includes means for (i) receiving three phases of primary current, (ii) providing corresponding phases of secondary current, preferably within a desired amperage metering range, (iii) choosing the largest magnitude secondary current and (iv) providing the largest magnitude secondary current as output.

The device further includes means for providing a voltage proportional to the largest magnitude secondary current, means for storing the peak voltage proportional to the largest magnitude secondary current and means, connected between output of the proportional voltage providing means and the peak voltage storing means, for moving a trip member thereby providing mechanical action to break a circuit in response to current therein exceeding a predetermined level.

The device still further includes means for directing the largest magnitude secondary current through the trip member moving means and means for actuating this directing means upon the first voltage substantially instantaneously rising to a predetermined first level. The device yet further includes means for actuating the directing means upon the first voltage reaching a second level and remaining at the second level for a preselected time interval.

The means for choosing the largest magnitude secondary current among the corresponding phases of secondary current and providing the chosen largest magnitude secondary current as output is preferably a passive diode bridge network.

The mean for providing voltage proportional to the largest magnitude secondary current is preferably a resistor.

The means for storing a peak value of voltage proportional to the largest magnitude secondary current is preferably a capacitor.

The mean for actuating the largest magnitude secondary output current directing means, upon the first voltage reaching a preselected level and remaining at the preselected level for a preselected time interval, is preferably a passive RC network.

The means for moving a trip member and thereby providing the mechanical action, in response to current exceeding a predetermined level, is preferably a coil positioned between output of the proportional voltage providing means and the peak value storing means but switched to ground to activate trip.

The means for providing voltage proportional to the largest magnitude secondary current further preferably includes a resistor receiving the largest magnitude secondary output current from the diode bridge network; this resistor allows current to flow to ground via first switching means operating responsively to a latch portion of the device. The latch disconnects the resistor from ground upon the latch being actuated.

The latch directs the largest magnitude secondary output current through the trip member moving means and operates responsively to predetermined functions of (i) magnitude and (ii) time derivative of a voltage proportional to the largest magnitude secondary current. The latch continuously directs the largest magnitude secondary output current through the trip member moving means after predetermined criteria, which may be functions of magnitude and time derivative of a voltage proportional to the largest magnitude secondary current, have been satisfied.

The invention accommodates a wide range of currents to be metered. This invention provides circuit breaking functions even at very low magnitude secondary currents output from the diode bridge network. Also, the circuit dissipates very little power; very large percentage of the largest magnitude secondary output current is used to energize the solenoid coil, providing the requisite mechanical action for circuit opening. The low power dissipation of the characteristic of the circuitry of the invention allows the invention to be used in severe operating environments. Moreover, because so little power is dissipated, the circuitry can be housed in a very compact package.

The invention preserves linearity over substantially the entire metering range of the circuit breaker.

DESCRIPTION OF THE PREFERRED EMBODIMENTS AND BEST MODE KNOWN FOR PRACTICING THE INVENTION

Figure 2:
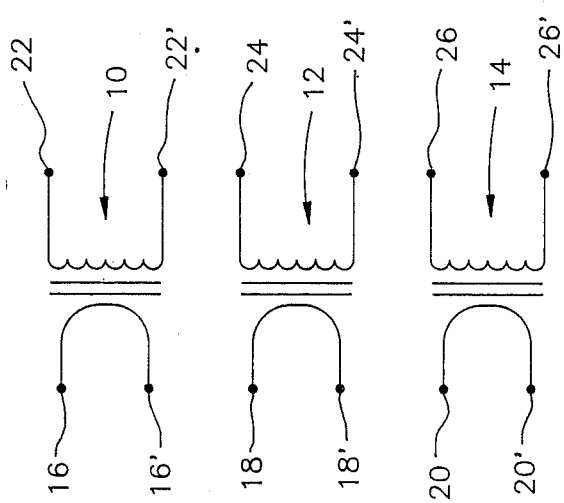
FIG. 2 is a schematic representation of transformers.

Referring to the drawings generally and to FIG. 2 in particular, 10, 12, 14 schematically represent three transformers having input terminals 16, 16', 18, 18' and 20, 20' respectively and output terminals 22, 22', 24, 24' and 26, 26' respectively. Transformers 10, 12, 14 receive respective phases of a three-phase input current where the first phase may be considered as being at terminals 16, 16', the second phase as being at terminals 18, 18' and the third phase as being at terminals 20, 20'. The input primary current is from a circuit in which fault current, in a three-phase current system, is to be detected.

Figure 1:
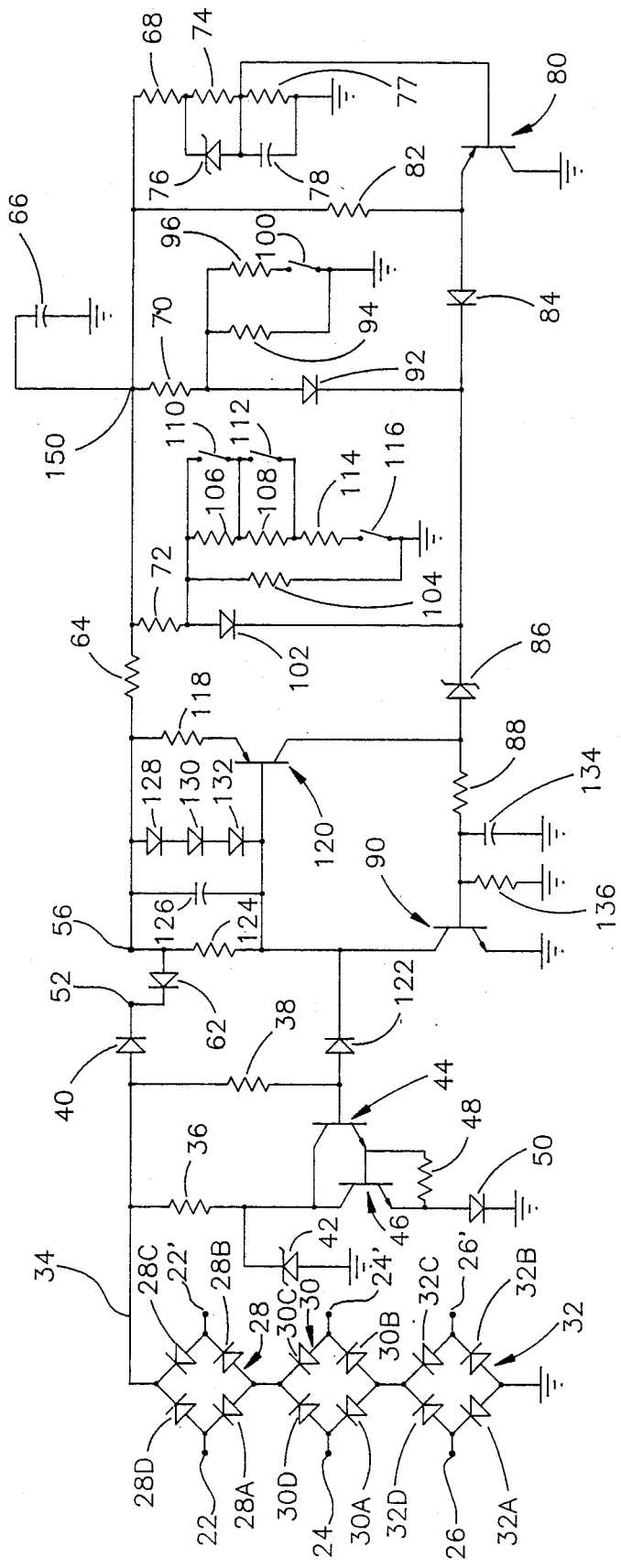
FIG. 1 is a schematic representation of circuitry manifesting aspects of the invention.

Referring to FIG. 1, terminals 22, 22', 24, 24' and 26, 26' of transformers 10, 12, 14 are connected to respective diode bridges denoted generally 28, 30 and 32 respectively. Diode bridge 28 includes diodes 28A and 28B having anodes connected together and having respective cathodes connected to terminals 22, 22'. Diode bridge 28 further includes diodes 28C, 28D having cathodes connected together and having anodes respectively connected to terminals 22, 22' and to respective cathodes of diodes 28A, 28B.

Diode bridge 30, similarly to diode bridge 28, includes diodes 30A, 30B having anodes connected together and having respective cathodes connected to terminals 24, 24'. Diode bridge 30 further includes diodes 30C, 30D having anodes respectively connected to terminals 24, 24' and to cathodes of diodes 30A and 30B, with diodes 30C and 30D having their cathodes connected together and to connected anodes of diodes 28A and 28B.

Diode bridge 32, similarly to diode bridges 28, 30, includes diodes 32A, 32B having their anodes connected together and to ground and having their respective cathodes connected to terminals 26, 26'. Diode bridge 32 further includes diodes 32C, 32D having anodes respectively connected to cathodes of diodes 32A, 32B and to terminals 26, 26' and having cathodes connected together and to connected anodes of diodes 30A, 30B.

Output of diode bridges 28, 30, 32 is provided via connected cathodes of diodes 28C, 28D via a line 34, to which a burden resistor 36 and another resistor 38 are connected, with line 34 connecting to an anode of a diode 40.

A zener 42 connects resistor 36 with ground. The terminal of resistor 36 to which zener 42 connects also connects to collectors of transistors 44, 46, configured as a Darlington pair. The emitter of transistor 44 connects to the base of transistor 46 and also to the emitter of transistor 46 via a resistor 48. The emitter of transistor 46 connects to ground via a diode 50.

Figure 3:
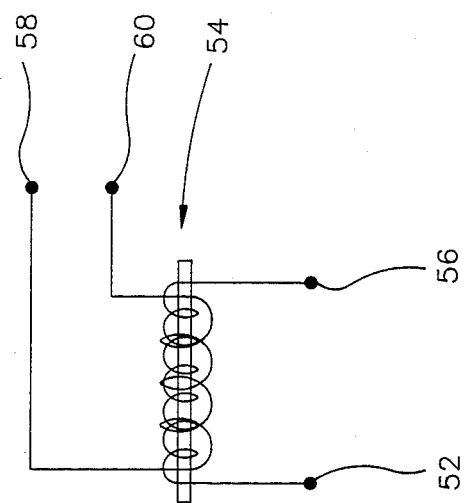
FIG. 3 is a schematic representation of a coil.

The cathode of diode 40 is connected to an input terminal 52 for a solenoid designated generally 54, illustrated schematically in FIG. 3. Solenoid 54 includes an output terminal 56 with the primary winding of solenoid 54 being between terminals 52, 56. If desired, solenoid 54 may further include a secondary winding, having terminals 58, 60, connected to an auxiliary switch or other means for external actuation of the circuit breaker.

A diode 62 is across terminals 52, 56 of solenoid 54 as illustrated in FIG. 1 with diode 62 having its cathode connected to terminal 52 and its anode connected to terminal 56.

Further connected to terminal 56 is a current limiting resistor 64 through which current may reach a capacitor 66 connected between resistor 64 and ground. Further connected to resistor 64 and capacitor 66 are resistors 68, 70 and 72. The remaining terminal of resistor 68 is connected to resistor 74. A zener 76 has its cathode connected to the common junction of resistors 68, 74 and its anode connected to the other side of resistor 74, where resistor 77 is also connected. The remaining terminal of resistor 77 is connected to ground. A capacitor 78 is also connected to the anode of zener 76, in parallel with resistor 77. The terminal defining connection of capacitor 78, the anode of zener 76 and the respective connected terminals of resistors 74, 77 is in turn connected to the base of a transistor 80, which is preferably a PNP-type. Transistor 80 has its collector connected to ground and its emitter connected via a resistor 82 to the junction of capacitor 66 and resistors 64, 68, 70 and 72.

The emitter of transistor 80 further connects to the anode of a diode 84 which in turn connects to the cathode of a zener 86 whose anode is connected via resistor 88 to the base of a transistor 90.

Resistor 70 is likewise connected via a diode 92 to a junction defined by the cathode of diode 84 and the cathode of zener 86. Resistors 94, 96 connect to resistor 70 at the terminal thereof which connects to the anode of diode 92. The remaining terminal of resistor 94 is connected to ground. The remaining terminal of resistor 96 may be connected to ground via a manual switch 100.

Similarly to resistor 70, resistor 72 is connected to a junction defined by connected cathodes of diode 84 and zener 86, via a diode 102. This terminal of resistor 72 is also connected to ground via resistor 104. Resistors 106 and 108, having switches 110, 112 respectively in parallel therewith, are in series connection with resistor 114 which in turn may be connected to ground via a switch 116. Switches 110, 112 and 116, similarly to switch 100, are preferably manually actuated.

A resistor 118 connects terminal 56 to the emitter of a transistor 120 which is preferably an PNP-type. The collector of transistor 120 is connected via resistor 88 to the base of transistor 90. The collector of transistor 90, which is preferably an NPN-type, is connected to the base of transistor 120. The base of transistor 44, connected via resistor 38 to line 34, is in turn also connected via diode 122 to the collector of transistor 90 and to the base of transistor 120.

The base of transistor 120 is also connected to terminal 56 via resistor 124. A capacitor 126 is in parallel with resistor 124. Further in parallel with resistor 124 and capacitor 126 are three series connected diodes 128, 130 and 132. The emitter of transistor 90 is connected to ground. The base of transistor 90 is also connected to ground via capacitor 134 and resistor 136 in parallel with one another.

During operation of the invention, if a single transformer, for example transformer 14 in FIG. 2, is active in the sense of a current passing through primary windings having terminals 20, 20', the secondary current induced between terminals 26, 26' forces its way through not only diodes 32C and 32D of diode bridge 32 but also through diode bridges 30 and 28. If a higher secondary current is flowing between two other terminals, such as terminals 22, 22' in one of the other diode bridges, such as diode bridge 28, the lower of the two currents flows as a current imbalance through the diode bridges. Current flowing in the diode bridges splits to flow through the two parallel paths in each diode bridge and recombines to exit a respective diode bridge. As a result, the highest current flowing in any of the three diode bridges 22', 24', 26' appears at line 34 as the output from the diode bridges. Remaining lower magnitude currents circulate internally within their respective diode bridges but do not add to the single highest current appearing at line 34. In other words, only the single highest current of the three phases appears at line 34; no summation of internal currents occurs.

As an example, if a secondary winding current of two amps is flowing between terminals 22, 22', from terminal 22 to terminal 22', and a secondary winding current of one amp is flowing between terminals 24, 24', from terminal 24 to terminal 24', the two amp current at terminal 24 flows through diode 30D but is blocked from flowing to terminal 24, by diode 30C. This current, which is at the connected cathodes of diodes 28A, 28B, splits between diodes 28A and 28B. The resulting split current flows as one amp through diode 28A and one amp through diode 28B. (This split current is in addition to the one amp of current already flowing between terminals 22 and 22,, from terminal 22 to terminal 22'.) The split currents flowing through diodes 28A and 28B combine with the already extant current endeavoring to flow from terminal 22 to terminal 22, so that the combined current through diodes 28C, 28D appearing at line 34 is of the same two amp magnitude as the current applied at terminals 24, 24'.

The resulting current in line 34 establishes a voltage across resistor 36, which is normally grounded through the collector and emitter of transistor 46 and through diode 50. Transistor 46 is normally "on" as a result of bias applied to the base of transistor 46 by the emitter of transistor 44, which bias is in turn a result of a current signal being applied to the base of transistor 44 via resistor 38; the current signal results from voltage at line 34 appearing across resistor 38.

Voltage at line 34 passing through diode 40 and through solenoid 54, connected between terminals 52, 56 as illustrated in FIG. 3, appears at terminal 56. Impedance presented by solenoid 54 is low; no significant voltage drop occurs between diode 40 and terminal 56.

A latch circuit is defined by transistors 90, 120 and associated passive elements and tends to be stable in either its conducting or non-conducting state. In the non-conducting state, essentially no current flows through either transistor 90 or transistor 120, or through any of their associated connected paths and components. As a result, circuit breaking decisions are made by components to the right of resistor 64 in FIG. 1. Resistor 64 is a small resistor, protecting capacitor 66 by limiting current thereto and functioning as a spike suppressor so decision circuitry to the right of resistor 64 in FIG. 1 does not respond to noise.

Signals below about 1,000 cycles pass through resistor 64 relatively unimpeded and are stored as voltage on capacitor 66. This assures that the circuit breaking trip decision is made on a direct current signal, not on an alternating current signal. Because voltage appearing at line 34 and passing through resistor 64 is normally the peak portion of a wave form, capacitor 66 filters that peak wave to a DC voltage.

The circuitry of the invention as illustrated in FIG. 1 provides a number of different circuit breaking actions. One of these is a long-time trip.

The long-time trip sequence begins with voltage accumulating on capacitor 78. Resistor 77 competes with capacitor 78 for charging current and thereby establishes the desired time band to define long-time trip. Zener 76 in parallel with resistor 74 creates an artificial knee in the time band charging curve so that capacitor 78 charges quickly if voltage at terminal 150 is high, but charges slowly if voltage at terminal 150 is low. Zener 76 causes an artificially accelerated charging rate when voltage at terminal 150 is above a selected point. This causes trip time to change rapidly when input current, provided via one of the pairs of diode bridge terminals, is above a selected value.

Voltage from capacitor 78 is applied to the base of transistor 80, which acts as an emitter follower, so that charging currents used to charge capacitor 78 do not limit current available for actuating the latch defined by transistors 90, 120 and associated components.

For some applications, slow or long-time trip and associated time constants are desirable. To achieve long time constants, charging currents must be small. If the latch transistors 90, 120 consume a large portion of the charging current, then irregularities within the latch could adversely affect charging rate. Transistor 80 isolates the firing circuitry defined by latch transistors 90, 120 from charging capacitor 78. This results in the charge accumulated on capacitor 78 being controlled by resistors 68, 74, 77, not by the firing circuitry connected to the emitter of transistor 80. Hence, voltage on capacitor 78 is a function of time and the values of resistors 68, 74 and 77 but is not a function of circuitry connected to the emitter of transistor 80. (If transistor 80 were not present, voltage on capacitor 78 would also be affected by the firing circuitry, including the latch, which is generally connected to the emitter of transistor 80 in FIG. 1. This would be undesirable.)

Resistor 82 reduces voltage from terminal 150 applied to the emitter of transistor 80 so that emitter voltage of transistor 80 tracks voltage appearing on capacitor 78. As a result, voltage at the emitter of transistor 80 is about one diode drop above voltage across capacitor 78 and tracks the voltage appearing across capacitor 78.

Voltage at the emitter of transistor 80 is lowered by diode 84 which provides one diode drop of voltage, from the emitter of transistor 80, to the cathode of zener 86.

When voltage at the cathode of zener 86 (which is one diode drop below emitter voltage of transistor 80) rises sufficiently to break zener 86, resulting bias applied via resistor 88 to the base of transistor 90 turns transistor 90 "on", permitting current to flow into the collector of transistor 90 and out of the emitter of transistor 90. Resulting collector current of transistor 90 creates bias at the base of transistor 120, turning transistor 120 "on" thereby placing the latch defined by transistors 90, 120 in its "on" or conducting state.

When transistor 120 turns on, voltage at terminal 56 drops close to ground potential as a result of the path provided to ground via resistor 124 through transistor 90. This causes current from one of diode bridges 28, 30, 32 to flow via line 34 and pass through coil 54, actuating the coil and providing the requisite mechanical action for opening the circuit of interest.

When transistor 90 is on and hence is saturated base current which would otherwise be provided to transistors 44, 46 is now shunted away through diode 122, whose cathode is connected to the collector of transistor 90. As a result, the Darlington pair of transistors 44, 46 turns "off" and current which had been passing through resistor 36 is forced through coil 54, from terminal 52 to terminal 56. As a result, resistor 36 does not compete with coil 54 for available firing current.

The sequence of operation of the circuit described above, whereby the circuit fires in response to voltage on capacitor 78 reaching a predetermined value, is the long-time trip or firing sequence of the invention.

Short-time trip results from voltage across diode 102 connected to the cathode of zener 86. When voltage on the anode of diode 102 (appearing across resistor 72 from terminal 150) reaches the level that the emitter voltage of transistor 80 must reach for long-time trip, the circuit fires by zener 86 breaking and the latch defined by transistors 90, 120 turning "on" as described above.

Voltage on diode 102 is a division of voltage at terminal 56 (which presumably has been charging capacitor 78 slowly in preparation for long-time trip.) A voltage divider is defined by resistor 72 and a combination of resistors 106, 108, 104 and 114, where the combination is selected by positioning switches 110, 112 and 116. By selecting settings for switches 110, 112 and 116 and selecting values for resistors 104, 106, 108 and 114, voltage at the top of diode 102 can be controlled, as can the rate at which that voltage reaches a level to fire the circuit by breaking zener 86.

Diode 92, resistors 70, 94 and 96 and switch 100 function analogously to diode 102, resistor 72 and the resistor-switch combination circuitry immediately to the right of diode 102 in FIG. 1, to provide additional options for defining short-time trip characteristics.

In the preferable short-time trip firing mode of the circuit, the circuit fires effectively instantaneously: Whenever voltage at terminal 56 is sufficient to cause the circuit to fire ("fire" denoting actuation of latch transistors 90, 120 with those two transistors shifting to their "on" or "conducting" state), the latch actuates, permitting current to flow through coil 54 and providing the requisite mechanical action to open the circuit of interest.

When switch 100 is open, short-time trip or firing is controlled by division of voltage between resistors 70 and 94. When switch 100 is closed, if resistor 96 is small the circuit associated with switch 100 is rendered effectively inoperative and firing is controlled by circuitry with which switches 110, 112, 116 are associated. Use of switches 100, 110, 112, 116 permits five different short-time, effectively instantaneous trip points in the sense that five different voltage levels, having five different rise characteristics, may be defined for circuit breaker actuation.

In the latch defined by transistors 90, 120, it is desirable that the transistor carrying the bulk of the latch current not carry such current through the transistor's base. (If latch transistors 90, 120 were connected in a "back-to-back" configuration, the bases of the so-connected transistors would be forced to carry most of the current circulating around the latch, which would be undesirable.) Resistor 124 prevents transistor 120 from having excessively high base current. Unfortunately, resistor 124 also tends to block current from reaching terminal 56 of coil 54.

In the latch, transistor 90 is the main current carrying transistor. Current through transistor 90, from the collector out through the emitter of transistor 90, must produce some voltage drop in order to bias transistor 120 "on" and thereby turn the latch "on." If resistor 124 were not present and an open circuit was provided in lieu of resistor 124, the circuit might appear to work properly in that when transistor 90 turned "on", transistor 90 would appear to draw current through transistor 120 and hence through coil 54. This would effectively create a short circuit through transistor 120, from its emitter to its collector if resistor 118 were not present. However, such a short circuit is prevented by resistor 118 between terminal 56 and the emitter of transistor 120; resistor 118 limits the emitter-base current in transistor 120. Were resistor 124 replaced by an open circuit, resistor 118 would limit current through coil 54. However, use of resistor 118 to protect transistor 120 could effectively block current from flowing through coil 54, thereby disabling the circuitry from performing its ultimate intended function.

To combat this problem, diodes 128, 130, 132 provide an alternate path so that most of the current passing through coil 54 travels through diodes 128, 130, 132 successively and then through the collector of transistor 90. Diodes 128, 130, 132, having current from coil 54 passing therethrough, provide a voltage drop sufficient to bias the base of transistor 120 so that transistor 120 turns "on."

While a resistor could be used in place of diodes 128, 130, 132, this would not be as desirable as the configuration illustrated because diodes 128, 130, 132 provide a significant voltage drop even for very small amounts of current. This voltage drop contributes to stability of the latch defined by transistors 90, 120 and their associated passive current elements. Diodes 128, 130, 132 do not provide any significant resistance to current flowing through coil 54 once the bias at the base of transistor 120, provided by diodes 128, 130, 132, has been established.

Capacitor 126 insures that the latch defined by transistors 90, 120 stays "on" even during zero crossings of a single phase signal. Capacitor 126 stores charge when the latch defined by transistors 90, 120 turns "on"; charge stored on capacitor 126 tends to keep the latch "on" by continuously biasing the base of transistor 120, even if there is no current through coil 54, once the latch turns on in response to an appropriate over-current condition.

Capacitor 126 also acts as a spike suppressor; hence capacitor 126 cannot be excessively large. While capacitor 126 tends to keep the latch "on" when the latch is already on, capacitor 126 likewise tends to keep the latch "off" when the latch is already off. For example, if transistor 90 operates only momentarily, the initial collector current in transistor 90 comes through capacitor 126 and does not provide sufficient voltage at the base of transistor 120 to turn transistor 120 on; this can occur if transistor 90 is held on for from about one-quarter to about one-half a millisecond.

Another advantage provided by resistor 124 is the dissipation of leakage current from transistor 120 through resistor 124. Leakage current in transistor 120 could cause the latch defined by transistors 90, 120 to self-actuate if resistor 124 were not present (to provide an escape path for any leakage current).

Many diodes, such as diodes 128, 130, 132, are somewhat photosensitive; resistor 124 helps to short those diodes when no substantial current is flowing therethrough, thereby eliminating any photosensitive effects which might otherwise act to trigger the latch.

Zener 76 introduces a knee into the circuit characteristic long-time trip curve. The time to charge capacitor 78, which controls long-time trip, is a function of the time constant of the RC combination defined by resistor 68 plus resistors 74 and 77 in parallel with capacitor 78; this time constant defines the exponential characteristic by which capacitor 78 charges to reach the selected voltage at which long-time trip occurs.

If zener 76 is not present and values of resistors 68, 74 are selected so that capacitor 78 reaches the trip voltage in a selected time for a selected current level, as current goes higher and higher, time to charge capacitor 78 does not decrease sufficiently to provide adequate protection for the circuit experiencing the over-current condition, due to the fixed values of resistors 68, 74. Specifically, if resistors 68, 74 are made small enough that high currents cause sufficiently rapid charging of capacitor 78, the circuit takes too little time to trip at lower currents.

This potential problem is cured by providing zener 76 to effectively reduce the resistance provided by the combination of resistors 68, 74, by shorting out resistor 74 above a selected voltage. Because zener 76 does not instantaneously short and collapse, zener 76 permits relatively smooth phasing between the condition at which resistor 74 is effectively in the circuit and the condition at which resistor 74 is effectively bypassed.

Resistor 136 affects voltage required on the cathode of zener 86 for firing the latch. Resistor 136 effectively shunts small currents away from zener 86. This is desirable because zeners depart from their theoretical ideal as voltage at the zener decreases. Hence, when relatively small voltages are across zener 86, some current flows through zener 86 even though the voltage across zener 86 is much less than normal circuit firing voltage. This undesirable leakage current is shunted away from the base of transistor 90 by resistor 136. To the extent current is shunted from the base of transistor 90, the voltage across zener 86 to cause firing is affected; hence the value of resistor 136 affects latch firing voltage.

An additional advantage provided by the circuit is that the voltage at line 34 prior to circuit firing is essentially divided between resistor 36 and coil 54 because resistor 38 has large impedance relative to resistor 36 and coil 54. Resistor 36 is essentially removed from the circuit when the circuit fires and the Darlington pair defined by transistors 44, 46 opens the connection between resistor 36 and ground. When this occurs, most of the current that had been passing through resistor 36 passes through coil 54.

In one preferred embodiment of the invention, switches 100, 110, 112, 114 have been provided as a single six-position DIP switch available from Grayhill. Transistors 46 and 90 have been 10 amp, 70 volt NPN type transistors available from Motorola, transistors 80, 120 have been 0.6 amp, 60 volt PNP type transistors available from Motorola and transistor 44 has been a 1.0 amp, 80 volt NPN type transistor also available from Motorola.

Zener 42 has been a 62 volt transient suppressor zener available from either Unitrode or Microsemi, zener 86 has been a 5.1 volt, 400 milliwatt zener available from either Motorola or Microsemi while zener 76 has been a 9.1 volt, 400 milliwatt zener available from either Motorola or Microsemi. The diodes in diode bridges 28, 30, 32 and diodes 40, 50, 62, 120, 130 and 132 have all been one amp, 200 volt rectifying diodes available from either Unitrode or General Instrument. Diodes 122, 102, 92 and 84 have been 200 milliamp, 100 volt rectifying diodes available from either Unitrode or Fairchild.

I claim:

1. A device for detecting a primary fault current in a three phase current system and converting said detected fault current into mechanical action for breaking a circuit in which said primary fault current occurred, comprising:
   a. means for receiving said three phases of primary current, providing corresponding phases of secondary current within a predetermined desired amperage metering range, choosing the largest magnitude secondary current and providing said largest magnitude secondary current as output therefrom;
   b. means for providing voltage proportional to said largest magnitude secondary current;
   c. means for storing a peak value of said voltage which is proportional to said largest magnitude secondary current;
   d. means, connected between output of said proportional voltage providing means and said peak value storing means, for moving a trip member and thereby providing said mechanical action, in response to current exceeding a predetermined level passing therethrough;
   e. means for directing said largest magnitude secondary output current through said trip member moving means;
   f. means for actuating said largest magnitude secondary output current directing means upon said voltage proportional to said largest magnitude secondary current substantially instantaneously rising to a predetermined first level; and
   g. means for actuating said largest magnitude secondary output current directing means upon said voltage proportional to said largest magnitude secondary current reaching a second level and remaining at said second level for a preselected time interval.

2. The device of claim 1 wherein said means for choosing largest magnitude secondary current among said corresponding phases of secondary current and providing said largest magnitude secondary current as output therefrom is a diode network.

3. The device of claim 1 wherein said means for providing voltage proportional to said largest magnitude secondary current is a resistor.

4. The device of claim 1 wherein said means for storing a peak value of said voltage which is proportional to said largest magnitude secondary current is a capacitor.

5. The device of claim 1 wherein said means for actuating said largest magnitude secondary output current directing means upon said first voltage reaching a second level and remaining at said second level for a preselected time interval is a passive RC network.

6. A device for providing a mechanical action for breaking a circuit in which an overcurrent condition has occurred, comprising:
   a. resistive means for providing voltage proportional to a current resulting from said overcurrent condition in said circuit;
   b. means for storing said voltage;
   c. coil means, connected between output of said proportional voltage providing means and said voltage storing means, for moving a trip member, in response to a current signal passing therethrough;

d. means for directing said current, for which said resistive means provides said proportional voltage, through said trip member moving means;
e. means for actuating said overcurrent directing means upon said proportional voltage substantially instantaneously rising to a predetermined level; and
f. means for actuating said overcurrent directing means upon said proportional voltage reaching a second level and remaining at said second level for a preselected time interval.

7. The device of claim 6 wherein said current, for which said resistive means provides said proportional voltage, is proportional to said overcurrent.

8. The device of claim 7 wherein said current, for which said resistive means provides said proportional voltage, is reduced from said overcurrent.

9. A device for detecting a primary fault current occurrence in a three phase current system and converting said detected fault current into mechanical action for breaking a circuit in which said primary fault current occurred, comprising:
a. transformer means receiving said three phases of primary current, for providing corresponding phases of secondary current within a predetermined desired amperage metering range;
b. diode bridge means for choosing largest magnitude secondary current among said corresponding phases of secondary current and providing said largest magnitude secondary current as output therefrom;
c. means for providing voltage proportional to said largest magnitude secondary current, comprising:
  i. resistor means receiving said largest magnitude secondary output current from said diode bridge means and providing said current to ground via first switch means;
  ii. said first switch means operating responsively to a latching means portion of said device and disconnecting said resistor means from ground upon actuation of said latching means;
  said voltage proportional to said largest magnitude secondary current being voltage at a terminal of said resistor remote from ground;
d. means for storing a peak value of said voltage proportional to said largest magnitude secondary current;
e. means, connected between output of said proportional voltage providing means and said peak value storing means, for moving a trip member and thereby providing said mechanical action, in response to current in excess of a preselected level passing therethrough;
f. said latching means being means, operating responsively to magnitude and time derivative of said voltage which is proportional to said largest magnitude secondary current, for continuously directing said largest magnitude secondary output current through said trip member moving means after a predetermined criterion based on said magnitude and time derivatives of voltage has been satisfied.

10. The device of claim 9 further comprising:
a. means for actuating said latching means upon said voltage substantially instantaneously rising to a first predetermined level; and
b. means for actuating said latching means upon said voltage reaching a second predetermined level lower than said first predetermined level and remaining at said second level for a preselected time interval.

11. The device of claim 9 further comprising:
a. means for storing a peak value of said voltage proportional to said largest magnitude secondary current; and
b. wherein said trip member moving means is connected between output of said proportional voltage providing means and said peak value storing means and operates in response to current passing therethrough.

12. The device of claim 10 further comprising:
a. a plurality of means for actuating said latching means upon said voltage reaching any one of a plurality of different predetermined second levels and remaining at said attained level for a preselected time interval associated with said attained level.

13. The device of claim 12 wherein said means for actuating said latching means upon said voltage reaching any one of a plurality of different predetermined second levels and remaining at said attained level for a preselected time interval associated with said attained level are passive RC networks.

14. The device of claim 12 wherein said means for storing a peak value of said voltage proportional to said largest magnitude secondary current is a capacitor.

15. The device of claim 13 wherein said plurality of means for actuating said latching means upon said voltage reaching any one of a plurality of different predetermined second levels and remaining at said attained level for a preselected time interval associated with said attained level further comprises:
a. a plurality of resistors connected in parallel with one another;
b. switch means for connecting selected ones of said plurality of resistors to said capacitor means for storing a peak value of said voltage proportional to said largest magnitude secondary current to define RC combinations having time constants defining said preselected times.

16. The device of claim 10 wherein said means for actuating said latching means upon said voltage reaching a second predetermined level, which is lower than said first predetermined level, and remaining at said second level for a preselected time interval is an RC combination.

17. The device of claim 9 wherein said latching means is operative responsively to predetermined functions of magnitude and time derivative of said voltage.

18. A latch circuit for connecting first and second devices in response to signal and permitting current to flow from said first device to said second device through said latch, comprising:
a. first and second transistors of opposite types;
b. said first transistor being PNP and having its emitter connected to ground, its collector connected to the base of said second transistor and its base connected to the collector of the second transistor;
c. said second transistor being NPN and having its emitter connected to said first device;
d. said connected first transistor base and said second transistor collector being connected to ground via resistive and capacitive means so that said connected first transistor base and said second transistor collector are above ground potential during operation of said latch.

19. A device for detecting a primary fault current occurrence in a three phase current system and converting said detected fault current into mechanical action for breaking a circuit in which said primary fault current occurred, comprising:
a. three transformers receiving said three phases of primary current and providing corresponding phases of secondary current within a predetermined desired amperage metering range;
b. three diode bridges interconnecting secondary windings of said transformers, for providing said largest magnitude secondary current as output, each diode bridge comprising:
 i. four diodes connected as two parallel pairs of diodes;
 ii. first diodes of each of said pairs having their anodes connected and
 iii. second diodes of each of said pairs having their cathodes connected;
 iv. cathodes of said first diodes of each of said pairs being connected to anodes of said second diodes of each of said pairs;
 v. respective terminals of secondary windings of respective ones of said transformers connected to respective diode bridges, one terminal between said first and said second diode of each of said diode pairs of a respective diode bridge;
c. a first resistor connecting an output terminal of said three diode bridges to ground, for defining a voltage proportional to said largest magnitude secondary current at said output terminal of said three diode bridges;
d. switching means provided by transistors configured as a Darlington pair for breaking connection between said voltage defining resistor and ground in response to voltage at the base of said second transistor exceeding a preselected threshold value, said first resistor being connected to said collector of said first transistor, said emitter of said first transistor of said pair being connected to ground;
e. a coil receiving current from said output terminal of said three diode bridges, for providing said mechanical action for breaking a circuit in which said primary fault current occurred, in response to current therethrough exceeding a threshold value;
f. a diode connected in parallel with said coil for forcing current from said output terminal of said three diode bridges through said coil;
g. a diode between said output terminal of said three diode bridges and said coil, for blocking flow of current from said coil towards said three diode bridges;
h. a current-limiting resistor connected to the output terminal of said coil, receiving current passing through said coil from said output terminal of said three diode bridges;
i. a capacitor connected between said current-limiting resistor and ground;
 i. said current-limiting resistor and said capacitor defining an RC combination to filter frequencies above a preselected threshold from said current which has passed through said coil and storing a voltage in the capacitor which is proportional to said voltage at said output terminal of said three diode bridges;
j. a second resistor connected between said base of said second transistor of said Darlington pair and said output terminal of said three diode bridges providing said largest magnitude secondary current, for applying a bias voltage to said base of said second transistor to thereby keep said Darlington pair turned on and permit most of said largest magnitude secondary current to flow through said first resistor to ground for so long as said largest magnitude secondary current does not exceed a preselected value;
k. means for storing a peak value of said voltage which is proportional to said largest magnitude secondary current;
l. means, connected between output of said proportional voltage providing means and said peak value storing means, for moving a trip member and thereby providing said mechanical action, in response to current exceeding a predetermined level passing therethrough;
m. means for directing said largest magnitude secondary output current through said trip member moving means;
n. means for actuating said largest magnitude secondary output current directing means upon said first voltage substantially instantaneously rising to a predetermined first level; and
o. means for actuating said largest magnitude secondary output current directing means upon said first voltage reaching a second level and remaining at said second level for a preselected time interval.

* * * * *